United States Patent
Pinnock

(10) Patent No.: US 11,940,555 B2
(45) Date of Patent: Mar. 26, 2024

(54) RADAR APPARATUS FOR A VEHICLE AND METHOD OF DETECTING MISALIGNMENT

(71) Applicant: ZF AUTOMOTIVE UK LIMITED, Solihull West Midlands (GB)

(72) Inventor: Rob Pinnock, Birmingham West Midlands (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 749 days.

(21) Appl. No.: 17/046,862

(22) PCT Filed: Apr. 18, 2019

(86) PCT No.: PCT/EP2019/060064
§ 371 (c)(1),
(2) Date: Oct. 12, 2020

(87) PCT Pub. No.: WO2019/202069
PCT Pub. Date: Oct. 24, 2019

(65) Prior Publication Data
US 2021/0149021 A1    May 20, 2021

(30) Foreign Application Priority Data
Apr. 20, 2018  (GB) ..................... 1806494

(51) Int. Cl.
*G01S 7/40*  (2006.01)
*G01S 13/86*  (2006.01)
*G01S 13/931*  (2020.01)

(52) U.S. Cl.
CPC .............. *G01S 7/4026* (2013.01); *G01S 7/40* (2013.01); *G01S 13/86* (2013.01); *G01S 13/931* (2013.01); *G01S 7/403* (2021.05)

(58) Field of Classification Search
CPC .......... G01S 7/4026; G01S 7/40; G01S 7/403; G01S 7/027; G01S 7/4034; G01S 13/86;
(Continued)

(56) References Cited

U.S. PATENT DOCUMENTS 7,337,650 B1    4/2008  Preston et al.
9,568,592 B1 *  2/2017  Brown .................. G01S 7/4004
(Continued)

*Primary Examiner* — Marc Anthony Armand
(74) *Attorney, Agent, or Firm* — TAROLLI, SUNDHEIM, COVELL & TUMMINO L.L.P.

(57) ABSTRACT

A radar apparatus for use in a vehicle (1) comprises a radar housing (6) which houses a radar sensor (7), a first 3-axis accelerometer (8) fixed so it cannot move relative to the radar sensor (7); a movable support (9) that comprises a first part (10), a second part (12), and an actuator (13) in which in use the first part (10) is fixed relative to the body (11) of the vehicle, the second part (12) is fixed relative to the radar housing (6), and the actuator is operable to move the second part relative to the first part around an axis that is fixed relative to the vehicle body by an actuator, and a signal processing apparatus (15) configured in use to determine a misalignment of the radar sensor from one or more of the signals output from the first 3-axis accelerometer (8) and one or more signals output from a second 3-axis accelerometer (16) fitted to the vehicle (1), in which the signals used are captured at different moments in time when the second part of the movable support is in two different positions.

18 Claims, 2 Drawing Sheets

(58) Field of Classification Search
CPC ........... G01S 13/931; G01S 2013/9327; G01S 2013/93271
See application file for complete search history.

(56) References Cited

U.S. PATENT DOCUMENTS

2015/0138012 A1   5/2015  Ando
2019/0153770 A1*  5/2019  Mitchell ................. G01S 13/56

* cited by examiner

RADAR APPARATUS FOR A VEHICLE AND METHOD OF DETECTING MISALIGNMENT

RELATED APPLICATION

This application corresponds to PCT/EP2019/060064, filed Apr. 18, 2019, which corresponds to British Application No. 1806494.9, filed Apr. 20, 2018, the subject matter of which are incorporated herein by reference in their entirety.

This invention relates to a method of detecting misalignment of a radar apparatus for a vehicle, and also to a radar apparatus installed in a vehicle which is capable of detecting misalignment.

For modern advanced driver assistance (ADAS) systems using one or more in-vehicle radar sensors, there is a need continually to ensure that the radar sensor is properly aligned. If the radar sensor becomes misaligned when the vehicle is parked and the driver is absent (for example, as the result of a minor bump in a car park), then the system needs to be able to detect this misalignment automatically, either to auto-recalibrate the radar sensor if possible, or if the misalignment is too great to set the system into a degraded or non-functioning mode with appropriate driver warning. Because the radar sensor must have a clear view of the road ahead of the vehicle, or to the side or rear, it is inherently vulnerable to damage which may cause misalignment of the radar sensor. Because it is a relatively expensive component, it is also common to mount it to the vehicle in a manner that enables it to move position rather than to break, allowing for the sensor position to be reset at a later time which is preferable to replacing a broken sensor.

Radar sensor misalignment detection is currently achieved by doing statistical analysis of the position of target objects other vehicles, etc. as detected by the radar sensor when the vehicle is being driven. The expected statistical distribution of these targets is known, and if it is found to be different, a suitable correction can be applied. The main shortcoming of this approach is that, depending on the pertaining driving scenario and particularly the number of suitable targets, it can take quite a long time to build up sufficient statistical confidence in the measure of misalignment. The aim for future misalignment detection systems is to detect any misalignment within a few seconds of driving off, whatever the driving scenario.

A further disadvantage of all known prior art based on measurements from linear accelerometers is that, in order to detect Z axis azimuthal (yaw) misalignment of the radar sensor module, the vehicle must be moving and accelerating straight ahead so that, in the presence of azimuthal misalignment of the radar sensor, a component of the vehicle's longitudinal X axis acceleration is coupled into the accelerometer that is nominally detecting the Y axis lateral acceleration in the radar module. Since this driving situation might not occur for some time after drive off, the vehicle may travel for some distance before the misalignment of the radar sensor is detected.

An object of the present invention is to provide a method and apparatus that overcomes the shortcomings of the prior art.

According to a first aspect the invention provides a radar apparatus for use in a vehicle, the apparatus comprising:

a radar housing which houses a radar sensor, a first 3-axis accelerometer fixed in position relative to the radar sensor;

a movable support that comprises a first part, a second part, and an actuator in which in use the first part is fixed relative to the body of the vehicle, the second part is fixed relative to the radar housing, and the actuator is operable to move the second part relative to the first part around an axis that is fixed relative to the vehicle body by an actuator, and a signal processing apparatus configured in use to determine a misalignment of the radar sensor from one or more of the signals output from the first 3 axis accelerometer and one or more signals output from a second 3 axis accelerometer that is fixed in position relative to the vehicle, in which the signals used are captured at different moments in time when the second part of the movable support is in two different positions.

The signal processing apparatus may be arranged in use to cause the movable support to move from one of the two different positions to the other between the two moments of time at which the determining of the misalignment is made.

Measurements may be taken when the second part is stopped in the first positon and when the second part is stopped at the second position. The signal processing apparatus may in use issue drive signals that cause the actuator of the movable support to rotate the radar housing to permit these measurements to be made.

The signal processing apparatus may be arranged to compare signals from the first 3 axis accelerometer with signals from the second 3 axis accelerometer with the movable support in the first position, and to compare signals from the first accelerometer with the movable support in the first positon with signals obtained from the first or second accelerometer when the second part of the movable support is in the second position.

The 3 axis accelerometer may be fixed relative to the radar sensor such that with the platform in the first positon and with the radar sensor in an ideal alignment the 3 axes of the first accelerometer X, Y and Z respectively lie on the longitudinal, lateral and vertical axes of the vehicle when vehicle is on a level region of road.

Similarly, the second 3 axis accelerometer may have axes X, Y and Z aligned with those same 3 axes on the vehicle.

The movable support may include a motor as the actuator. In this case the signal processing apparatus may issue motor position signals to a controller for the motor which in turn causes the motor to move to demanded motor positions.

The actuator, preferably a motor, may be arranged to rotate the radar housing around the fixed longitudinal X axis of the vehicle to induce some roll when moving from the first positon to the second position of the movable support. In an alternative it may be arranged to rotate the radar housing around the fixed lateral axis of the vehicle to induce some pitch.

When the radar sensor is in a position of normal use, the movable support may be in the first position. Therefore, after the determining of any misalignment is completed the signal processor may be arranged to move the support back to the first position. Where misalignment has been detected this first position may be changed to remove the misalignment resulting in a corrected first position.

The motor may be arranged to rotate the radar housing around two orthogonal axes X and Y, or three mutually orthogonal axes X, Y and Z, for instance around two or three of the longitudinal, lateral and vertical axes of the vehicle. This may allow the motor to move the housing to correct for any detected misalignment. Where it may move around more than one axis, it may move around only one of those when moving from the first to the second positions of the movable platform or around two or more of them.

In the proposed system of the invention, the radar housing may therefore be fitted with an integral 3-axis accelerometer measuring nominally longitudinal (x), lateral (y), and vertical (z) linear accelerations for a correctly aligned radar sensor, and a motor assembly able to provide angular adjustment of the complete radar sensor around at least one axis. This motor may be of the type currently used to provide, for example, adjustment of headlight beam angle. In order to enable derivation of angular misalignments of the radar module around all three axes, including azimuthal (yaw) misalignment around the z axis, a known small angular rotation of the radar module around either the longitudinal x axis (roll rotation), or around the lateral y axis (pitch rotation) is deliberately applied to the radar module whilst the vehicle is still stationary before driving off. This deliberate initial roll or pitch rotation enables detection of any azimuthal misalignment of the radar sensor whilst the vehicle is still stationary.

The movable platform should be fixed rigidly to the vehicle body so that it cannot be displaced easily in a collision. The first part may be secured to a structural cross beam of the vehicle for example, using one or more bolts. This ensures that the axis around which the movable platform rotates is not misaligned relative to the body of the vehicle if a light collision to the radar housing occurs.

According to a second aspect the invention provides a method of detecting misalignment, or checking for the correct alignment, of a radar apparatus for a stationary vehicle according to claim 1, the method comprising:

comparing the acceleration signals output for at least two axes of the first 3 axis accelerometer captured when the second part is in a first position with the acceleration output from the corresponding two axes of the second 3 axis accelerometer when the second part is in the first position to determine any misalignment of the radar sensor for pitch or roll, moving the second part of the movable platform to a second position by rotation about one or both of the longitudinal or lateral axes of the vehicle, and observing at least one of the acceleration signals output for the first 3 axis accelerometer when the second part is in the second position and in the event that the signal differs from the corresponding signal captured when the second part is in the first position by an amount which does not meet a predefined allowable value determining that the radar is incorrectly aligned for yaw.

The values of the signals from two axes may be compared when the second part is in the first position may comprise the X and Y axes of each sensor which may each be aligned with the longitudinal and lateral axes of the vehicle respectively when the radar sensor is correctly aligned. If not aligned with the respective longitudinal and lateral axes, these two axes may otherwise lie in a horizontal plane when the radar sensor is in an ideal alignment and the vehicle is stationary on a horizontal surface.

The method of the second aspect may therefore detect both pitch and roll misalignment with the housing in its first position which is the normal position of the radar housing during use, and detect azimuthal misalignment by comparing signals captured with the platform in the first positon and in the second position, or in some cases solely from signal captured with the platform in the second position. Signals solely captured in the second position can be used if the change in acceleration for one or more of the axes of the first sensor can be determined solely from the signals captured at the second position.

The method may cause the platform to roll about the longitudinal axis of the vehicle or pitch about the lateral axis of the vehicle when moving from the first positon to the second position. In each case, only the orthogonal X or Y axes need be observed to see if any change in acceleration occurs. With no misalignment it would be expected that there would be no acceleration change in the output of the axis orthogonal to the axis around which the second part has been rotated.

The change may be identified by comparing the output of the axis of the first 3 axis position sensor before and after the movement, or comparing the output after the movement with the output of the second 3 axis accelerometer optionally after any compensation for pitch or roll misalignment has been applied.

Importantly the first moment in time and third moments in time should be selected to be moments when the vehicle is known to not have moved. This may correspond to a time when the vehicle ignition is turned off, for example.

Where the radar housing is initially installed so that the X-axis of the first 3 axis accelerometer is aligned with the longitudinal axis of the vehicle, and the X-axis of the second 3-axis accelerometer is also aligned with that same axis, roll caused by the motor about the longitudinal axis will not cause any change in the output of the X-axis of the first 3 axis accelerometer. If there is a change, this will indicate that the radar sensor is misaligned so that its nominal X-axis is not lying correctly on the longitudinal axis of the vehicle.

Observing the acceleration signals output from only the X and Y axes is sufficient for the invention to determine misalignment when the vehicle is stationary on a perfectly horizontal surface, as in this case with perfect alignment only the Z axis will experience any acceleration due to gravity. In practice most road surfaces are not perfectly flat due to camber or being on a hill, and so the invention may additionally observe and compare signals output from all three axes of the two 3-axis accelerometers. This allows a rapid capture of the misalignment when the vehicle is stationary in any position, rather than having to wait until the second 3 axis accelerometer showed the vehicle to be stationary on a perfectly horizontal plane.

The method may comprise generating one or more offset values to be applied to the output of one or more axes of the first 3 axis accelerometer to compensate for any misalignment that is detected during the method. An offset value may be derived for each of the 3 signals output from the first 3 axis accelerometer.

In addition or in an alternative, the method may comprise driving the actuator of the movable support to place the radar housing in a modified first position to enable detected angular misalignments to be physically corrected. This modified first position may be used at all times when the vehicle is being driven so that the radar misalignment is removed and will correspond with the ideal first positon for the radar sensor. This may be needed whenever the radar housing has been physically misaligned relative to vehicle body, perhaps after a low speed collision.

There will now be described, by way of example only, one embodiment of the present invention with reference to the accompanying drawings of which:

Figure 1:
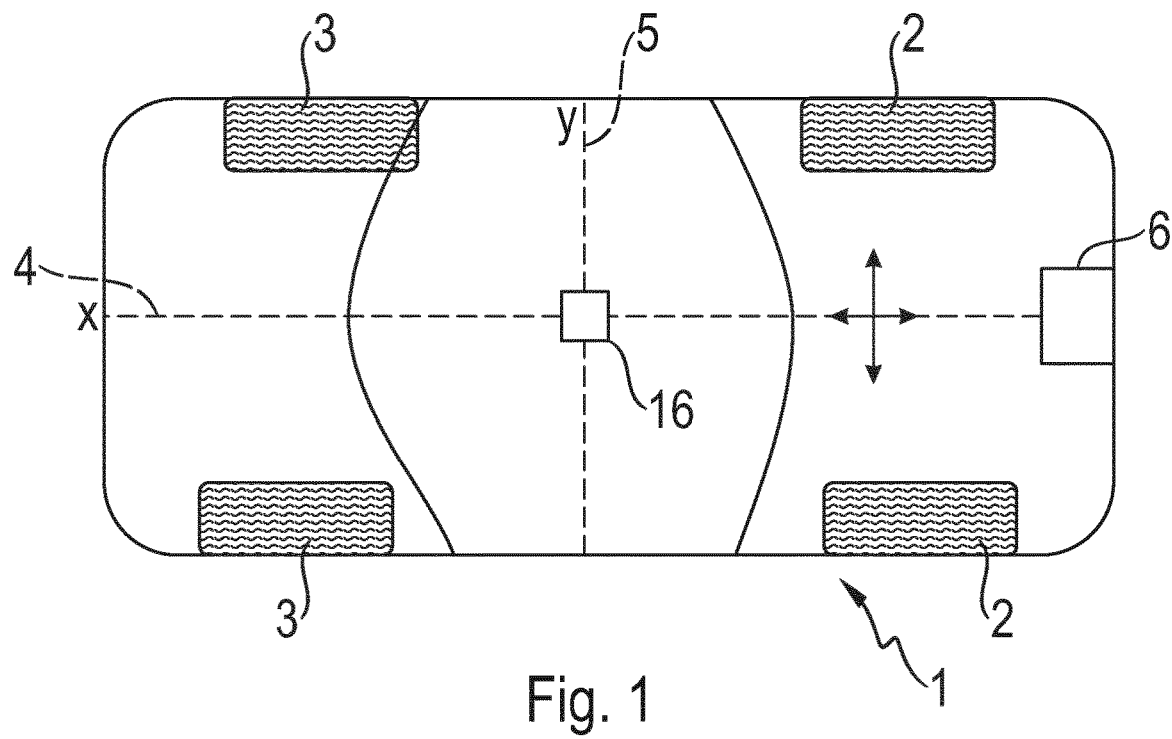
FIG. 1 shows an embodiment of a radar apparatus within the scope of the first aspect of the present invention fitted to a vehicle.
Figure 2:
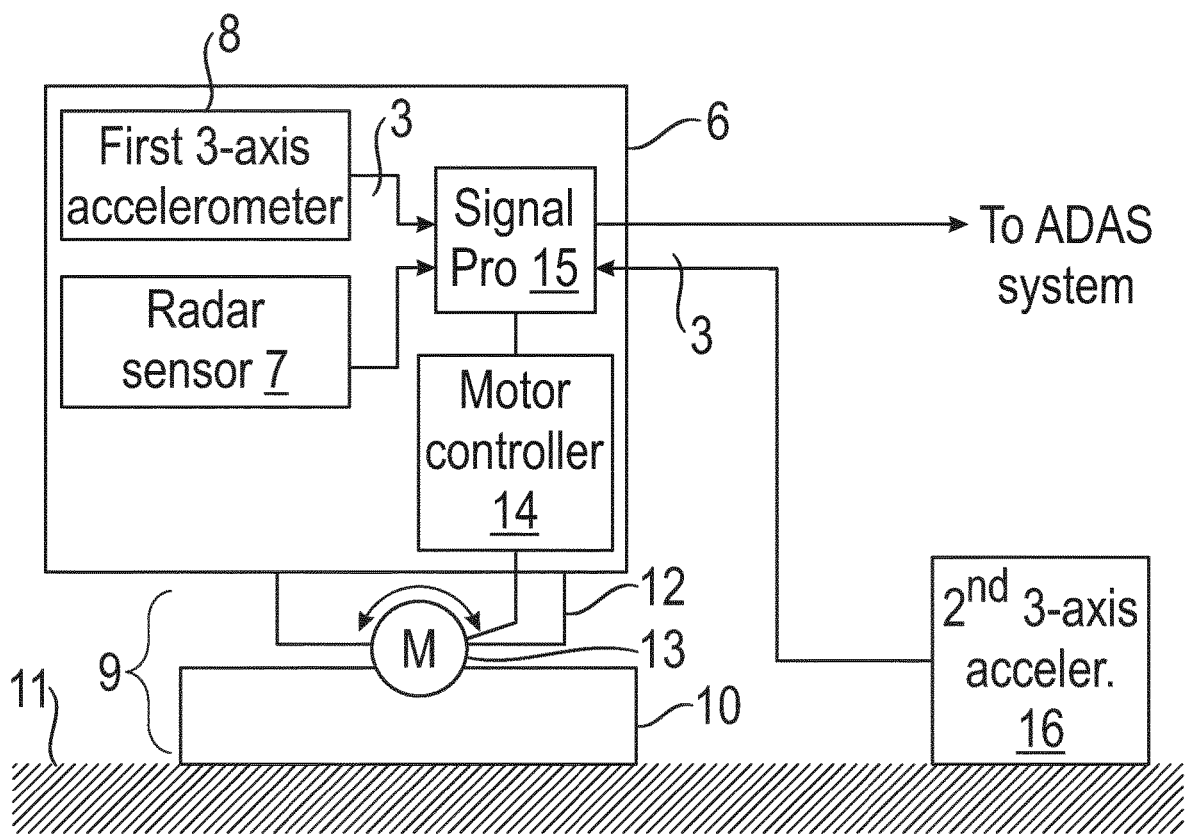
FIG. 2 shows in more detail the component parts of the apparatus and how they are interconnected electrically and to the vehicle body.
Figure 3:
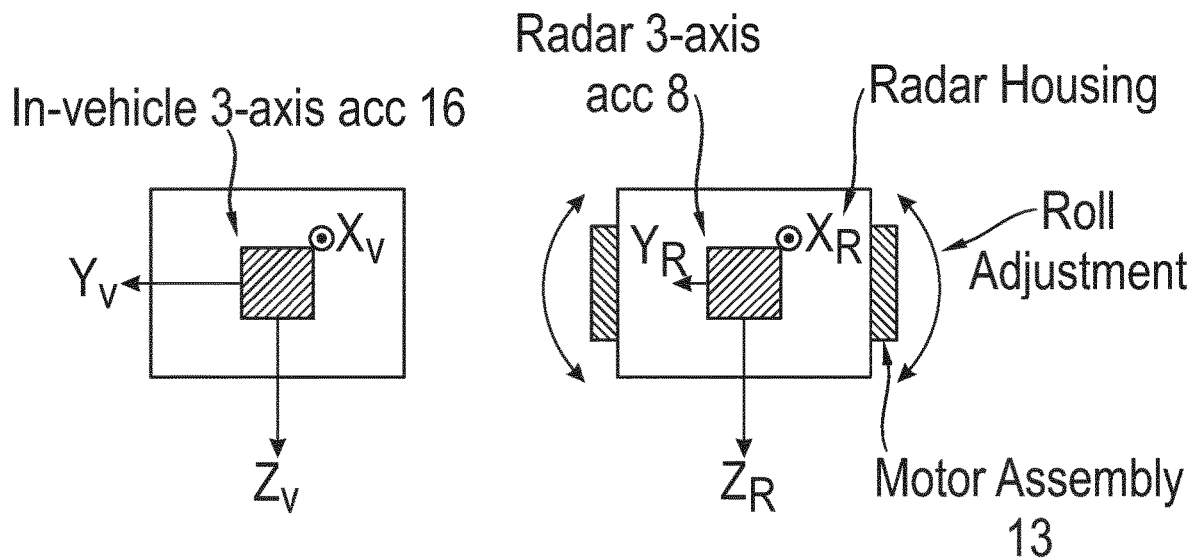
FIG. 3 shows in more detail the ideal initial alignment of the radar sensor and the first and second 3 axis accelerometers of the apparatus of FIG. 1.

FIGS. 1 to 3 show an embodiment of a radar apparatus in accordance with a first aspect of the present invention fitted to a vehicle 1. The vehicle is shown in plan from above and has two front wheels 2 and two rear wheels 3. The vehicle has a defined longitudinal axis 4 represented as a dashed line that is denoted here as the X axis which is aligned with the direction of travel of the vehicle when moving forward in a straight line. Any rotation around this axis will cause roll of the vehicle. It has a lateral axis 5 that is orthogonal to the direction of travel when moving in a straight line that is denoted here as the Y axis and again indicated by a dotted line. The vehicle will rotate around this axis when accelerating and decelerating as the vehicle pitch changes. It also has a vertical Z axis and the vehicle will rotate around this to create yaw as the vehicle turns a corner. The Z axis is not marked in FIG. 1 as it extends orthogonally out of the plane of the figure.

Fitted to the front of the vehicle is a radar housing 6 which houses a radar sensor 7. The content of the housing and the manner in which it is fixed to the vehicle can best be seen in FIG. 3 of the drawings. A first 3-axis accelerometer 8 is housed in the housing 6 so it cannot move relative to the radar sensor 7. The radar housing 6 is secured to the vehicle by a movable support 9 that comprises a first part 10 that in use is fixed relative to the body 11 of the vehicle and a second part 12 that is fixed relative to the radar housing 6. The second part is movable through a range of positions around an axis that is longitudinal to the vehicle body, i.e. so that the second part can roll around the X axis of the vehicle. In normal use the second part is fixed in a first position but as will be explained it can be moved through a small angle to create roll around the x axis by an actuator in the form of an electric motor 13.

The motor 13 is controlled by a motor controller 14 which is operable to cause the motor 13 to move the second part 12 to rotate when commanded by a signal from a processing apparatus 15. As shown this signal processing apparatus is fitted inside the radar housing 6 but could be located elsewhere on the vehicle.

The signal processing apparatus 15 receives as an input the 3 axis output signals from the first 3 axis accelerometer 8 that is located inside the radar housing 6. In this example the accelerometer 8 is located in the housing so that the 3 axes X, Y and Z of the accelerometer are aligned with the X, Y and Z axes of the vehicle when the radar sensor is perfectly aligned. This can best be seen in FIG. 1.

The signal processing apparatus 15 also receives three output signals from a second 3 axis accelerometer 16 fitted to the vehicle. This also has the three axes X, Y and Z aligned with the corresponding axes of the vehicle. It is located away from the radar housing so that it cannot be misaligned when the housing is misaligned and provides a frame of reference. This is shown in FIG. 3 of the accompanying drawings. Although shown as being at the CoG of the vehicle this is not essential in all embodiments that may be considered within the scope of the present invention.

Each of 3 axis accelerometers 8,16 will each typically comprise a vehicle inertial measurement unit (IMU) which includes the 3 axis sensing element and a signal processing unit that derives 3 acceleration signals from the sensing elements. To reduce shock the IMU may mount the sensing elements using shock absorbing mountings, allowing the effects of high frequency noise to be eliminated prior to any electronic signal processing if desired. Suitable IMUs are widely available commercially for use in automotive applications.

The signal processing apparatus 15 is configured in use to determine a misalignment of the radar sensor 7 by processing the output of the first 3 axis accelerometer 8 with signals output of the second 3 axis accelerometer fitted to the vehicle when the second part of the movable support is in two different positions and when the vehicle is stationary.

The following description describes the case where the initial motorised rotation is around the roll X axis, but an equivalent situation also pertains to the case where the initial rotation is around the pitch axis as explained further below.

Note that during any measurements referenced below the vehicle will be stationary and the sensor will be stationary. Measurements are not taken in this example as the platform is being moved. Hence the only accelerations observed by the accelerometers 8,1 will be those due to the effects of gravity.

The method of operation of the apparatus of FIGS. 1 to 3 will now be explained. At a first moment in time upon ignition on, but before driving off, the acceleration measurements from the first 3 axis accelerometer mounted in the radar module are compared with those measured by the second three axis accelerometer mounted at or close to the vehicle's yaw centre or centre of gravity. Note that this second 3 axis accelerometer does not necessarily have to be at even or close to the CoG of the vehicle, but just sufficiently separated from the radar sensor to ensure that it doesn't itself suffer misalignment when the radar sensor becomes misaligned. After optionally compensating for any effects arising from (i) sensor offsets and drifts through the use of stored calibration data, and (ii) the physical separation of the two 3 axis accelerometers, the x, y and z linear accelerations due to gravitational acceleration, since the vehicle is not moving measured by the individual 3 axis accelerometers are used to derive radar module and vehicle pitch ($\theta_R$, $\theta_V$) and roll ($\phi_R$, $\phi_V$) angles.

If the derived radar module and vehicle pitch and roll angles $\theta_R$, $\theta_V$ and $\phi_R$, $\phi_V$ derived from the acceleration measurements from the two 3 axis accelerometers, match each other, then it can be assumed that no pitch or roll misalignment of the radar module has occurred. If either or both the pitch and roll angles derived from the two 3 axis accelerometer do not match, then it can be assumed that misalignment of the radar housing 6 has occurred during the period in which the vehicle was parked, prior to ignition on. In this case, either: (i) the motor can move the radar housing to physically correct for the detected misalignment by realigning the radar housing by the appropriate angle; (ii) appropriate corrections can be applied to the subsequent radar sensor measurements in software; (iii) in the case of too large a misalignment discrepancy, the radar apparatus can be shut down and the driver alerted.

It is possible that, even though no pitch or roll misalignment has been detected, purely azimuthal (yaw) misalignment $\psi_R$ of the radar sensor may have occurred. If so, the present embodiment enables this also to be detected whilst the vehicle is still stationary, as follows.

In the simplest case, where the vehicle is standing on level ground and the two 3 axis accelerometers 8,16 are perfectly aligned with the X and Y axes in the horizontal plane, then after appropriate offset compensation both 3 axis accelerometers will measure zero acceleration in the x (longitudinal) direction. Even if the radar sensor 7 has suffered some azimuthal misalignment, the first 3 axis accelerometer will, in these circumstances, still measure zero acceleration in the x direction, because purely azimuthal misalignment will not cause any cross-coupling of gravitational acceleration into the longitudinal direction.

The applicant has appreciated that in these circumstances, the radar sensor 7 may be deliberately rolled about the x-axis by some small angle $\phi_R$ using the movable support 9. Then the fact that the radar sensor housing 6 and hence, also, the 3 axis accelerometer 8 within the radar housing 6 has already suffered some azimuthal angular misalignment $\psi_R$ means that a small amount of cross-coupling of the acceleration due to gravity into the x axis accelerometer of the 3 axis accelerometer 8 in the radar housing 6 will occur. This is because the x-axis of the first accelerometer 8 is no longer aligned perfectly with the longitudinal axis of the vehicle 1 and hence is not aligned with the roll axis of the movable support 9. For a vehicle standing on level ground with an azimuthal angular misalignment $\psi_R$ of the radar housing 6, the amount of gravitational acceleration cross-coupling into the x axis accelerometer in the radar housing, $\delta A_{RX}$, is approximately given by:

$$\delta A_{RX} = g \sin \phi_R \sin \psi_R$$

Since, in this scenario, the longitudinal acceleration measured by the second 3 axis accelerometer is still zero, the parameter $\delta A_{RX}$ here simply represents the difference between the longitudinal accelerations measured by the two accelerometers.

The actual azimuthal misalignment angle can be found from the above equation as:

$$\psi_R = \sin^{-1}(\delta A_{RX}/g \cdot \sin \phi_R)$$

which, as before, allows appropriate corrections to be applied to the subsequent radar housing measurements, either by physical adjustment of the radar housing by the motor assembly, or by software-based correction of the received signal data, or, in the case of too large a discrepancy, by shutting down the radar apparatus and alerting the driver.

The above equation for $\delta A_{RX}$ is an approximation, because additional small cross-coupling effects may also influence the amount of gravitational acceleration that is coupled into the x axis of the first 3 axis accelerometer. For example, if the vehicle is parked on a slope, or on a road with a significant camber, then the road pitch and roll angles will also need to be taken into account when assessing what any measured difference in x axis accelerometer measurements means in terms of azimuthal misalignment.

For example, if the vehicle is parked on a road with a significant gradient (which, from the point of view of the two 3 axis accelerometers, would appear as a pitch angle $\theta_{ROAD}$, and which would of itself cause an amount of the gravitational acceleration g sin $\theta_{ROAD}$ to be coupled into and measured by the two 3 axis accelerometers), then even for the same $\phi_R$ and $\psi_R$ as previously, the difference in longitudinal acceleration measured by the two 3 axis accelerometers would be slightly different from $\delta A_{RX}$ above, because the pitch angle $\theta_{ROAD}$ has an influence on the cross-coupling caused by the induced roll angle $\phi_R$.

The method therefore intentionally causes some roll at a second moment in time by moving the second part of the movable support, and at a third moment in time when the housing has been rolled further comparison of the signals from the 3-axis accelerometers is made as outlined above to determine if there has been any yaw misalignment of the radar sensor.

Figure 4:
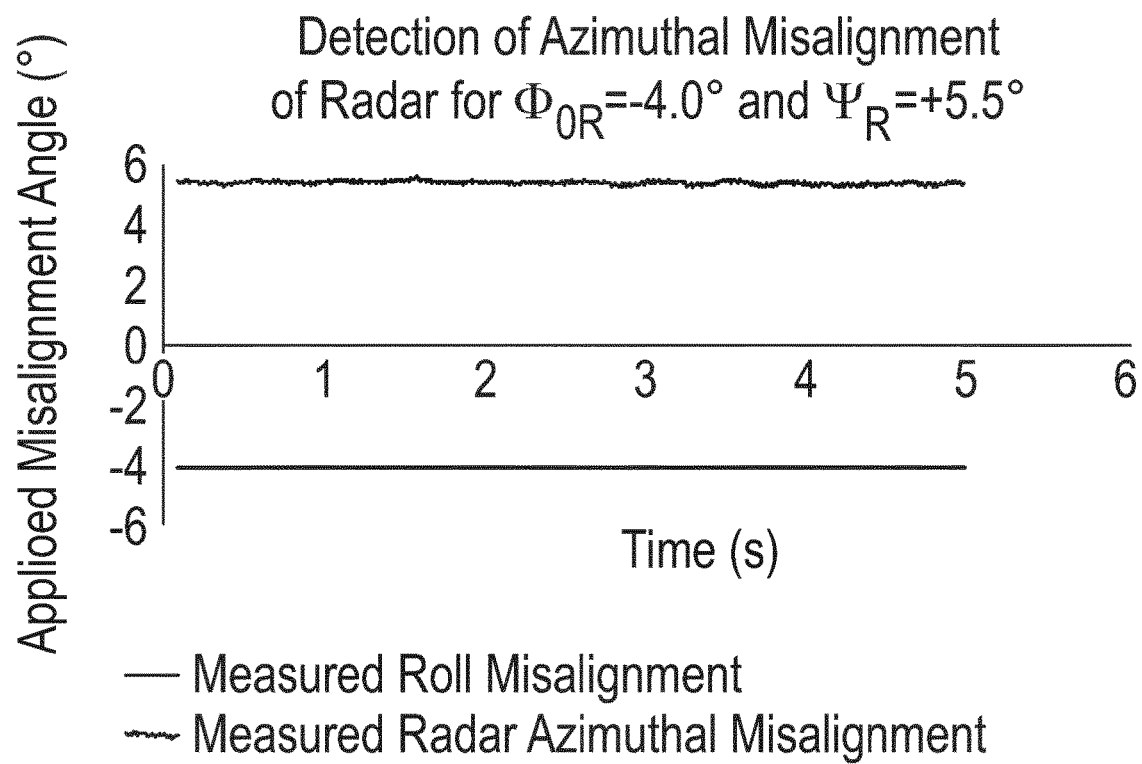
FIG. 4 shows how the azimuthal misalignment has been determined during an experimental test of the apparatus.

FIG. 4 shows a sample of processed static measurements (so that the only acting acceleration is that due to gravity) undertaken in during a test of an apparatus as shown in FIGS. 1 to 3, with an azimuthal misalignment of $\psi_R \approx 5.5°$ applied to the radar module, and a roll angle $\phi_R$ of $-4°$ subsequently applied. It can be seen that both the roll and azimuthal misalignments can accurately be derived from the measured static linear acceleration data.

As noted above, a similar principle pertains to the case where the applied initial rotation $\theta_R$ at the second moment of time is about the pitch (lateral) Y axis rather than the X axis. A method of determining misalignment using a system that may move the platform through roll around the Y axis of the vehicle is also envisaged to fall within the scope of the present invention. In this case, for a vehicle standing on level ground with an azimuthal angular misalignment $\psi_R$ of the radar sensor housing, the amount of gravitational acceleration cross-coupling into the y axis accelerometer, $\delta A_{Ry}$, is approximately given by:

$$\delta A_{Ry} = g \sin \theta_R \sin \psi_R$$

As before, in this scenario, the lateral acceleration measured by the second 3 axis accelerometer is still zero, so that the parameter $\delta A_{Ry}$ here simply represents the difference between the lateral accelerations measured by the two 3 axis accelerometers.

The actual azimuthal misalignment angle can be found from the above equation as:

$$\psi_R = \sin^{-1}(\delta A_{Ry}/g \cdot \sin \theta_R)$$

The applicant is aware that some automotive radar apparatus are being specified with integrated motor assemblies to enable correction of radar alignment to compensate for different vehicle loadings, etc. The applicant foresees that in some arrangement these same motor assemblies could be used to provide the initial rotation as described above to enable detection of physical misalignment of the radar module itself as well as being used to move the radar housing to enable to the signals required to complete the misalignment determination steps of the method.

The skilled reader will appreciate that the apparatus and method proposed herein enables full characterization of the alignment of the radar sensor, including detection of any azimuthal misalignment, whilst the vehicle is still stationary following ignition on. The full alignment characterization may occur within about a second of ignition on depending on factors such as switch on times, sampling rates, etc. In the prior art, derivation of azimuthal misalignment of the radar module requires the vehicle to be accelerating ahead in a straight line, which may not occur until the vehicle has travelled some considerable distance.

The motor assembly attachment not only provides the means for enabling detection of azimuthal angular misalignment of the radar sensor, but may also be used physically to realign the radar sensor depending on the number of axes in which the motor is able to adjust the angular position of the radar sensor. The radar sensor can therefore be physically realigned after misalignment has occurred, possibly over a larger range of angular misalignment than is currently considered acceptable for software-based signal correction techniques to be used.

A further advantage achievable in an embodiment with the scope of the invention is that it requires no accurate initial positioning of the radar sensor since the initial end of vehicle production line misalignments between the two 3 axis accelerometers, provided these are not too large, can be measured and either immediately corrected through motorised adjustment of the radar sensor, or stored in a memory and used to correct subsequent acceleration measurements.

The invention claimed is:

1. A radar apparatus for use in a vehicle, the apparatus comprising:
   a radar housing which houses a radar sensor,
   a first 3-axis accelerometer fixed in position relative to the radar sensor;
   a movable support that comprises a first part, a second part, and an actuator in which in use the first part is fixed relative to the body of the vehicle, the second part is fixed relative to the radar housing, and the actuator is operable to move the second part relative to the first part around an axis that is fixed relative to the vehicle body by an actuator, and
   a signal processing apparatus configured in use to determine a misalignment of the radar sensor from one or more of the signals output from the first 3 axis accelerometer and one or more signals output from a second 3 axis accelerometer that is fixed in position relative to the vehicle, in which the signals used are captured at different moments in time when the second part of the movable support is in two different positions.

2. A radar apparatus according to claim 1 in which the signal processing apparatus issues position signals that cause the movable support to automatically move from one of the two different positions to the other between the two moments of time at which the determining of the misalignment is made.

3. A radar apparatus according to claim 1 in which the signal processing apparatus is arranged to compare signals from the first 3 axis accelerometer with signals from the second 3 axis accelerometer with the movable support in the first position, and to compare signals from the first accelerometer with the second part of the movable support when in the first positon with signals obtained from the first or second accelerometer when the second part of the movable support is in the second position.

4. A radar apparatus according to claim 1 in which the first 3 axis accelerometer is fixed relative to the radar sensor such that with the movable support in the first positon the 3 axes of the first accelerometer X, Y and Z respectively lie on the longitudinal, lateral and vertical axes of the vehicle when the vehicle is on a level region of road and in which the second 3 axis accelerometer also has axes X, Y and Z aligned with those same 3 axes on the vehicle to define an ideal alignment of the radar sensor.

5. A radar apparatus according to claim 1 in which the movable support includes a motor as the actuator and the signal processing apparatus in use issues motor position signals to a controller for the motor which in turn causes the motor to move to demanded motor positions.

6. A radar apparatus according to claim 1 in which the actuator is arranged to rotate the radar housing around a fixed longitudinal X axis of the vehicle to induce roll when moving from the first positon to the second position.

7. A radar apparatus according to claim 1 in which the actuator is arranged to rotate the radar housing around two orthogonal axes X and Y, or three mutually orthogonal axes X, Y and Z.

8. A radar apparatus according to claim 1 in which a fastener fixes the movable support to the vehicle body.

9. A method of detecting misalignment, or checking for the correct alignment, of a radar apparatus for a stationary vehicle according to claim 1, the method comprising:
   the signal processing apparatus comparing the acceleration signals output for at least two axes of the first 3 axis accelerometer captured when the second part is in a first position with the acceleration output from the corresponding two axes of the second 3 axis accelerometer when the second part is in the first position to determine any misalignment of the radar sensor for pitch or roll,
   the signal processing apparatus sending the position signals to the actuator to move the second part of the movable platform to a second position by rotation about one or both of the longitudinal or lateral axes of the vehicle, and
   the signal processing apparatus observing at least one of the acceleration signals output for the first 3 axis accelerometer when the second part is in the second position and in the event that the signal differs from the corresponding signal captured when the second part is in the first position by an amount which does not meet a predefined allowable value determining that the radar is incorrectly aligned for yaw.

10. A method according to claim 9 in which the values of the signals from two axes that are compared when the second part is in the first position comprise the X and Y axes of each sensor which are aligned with the longitudinal and lateral axes of the vehicle respectively when the radar sensor is correctly aligned.

11. A method according to claim 9 comprising the signal processing apparatus issuing the position signals for automatically causing the platform to roll about the longitudinal axis of the vehicle or pitch about the lateral axis of the vehicle when moving from the first positon to the second position.

12. A method according to claim 9 in which the misalignment is identified by comparing the output of the axis of the first 3 axis position sensor before and after the movement, or comparing the output after the movement with the output of the second 3 axis accelerometer optionally after any compensation for pitch or roll misalignment has been applied.

13. A method according to claim 9 in which the first moment in time and third moment in time are moments when the vehicle is known to not have moved.

14. A method according to claim 9 further comprising the signal processing apparatus generating one or more offset values to be applied to the output of one or more axes of the first 3 axis accelerometer to compensate for any misalignment that is detected during the method.

15. A method according to claim 9 comprising the signal processing apparatus driving the actuator of the movable support to place the radar housing in a modified first position to enable detected angular misalignments to be physically corrected.

16. A radar apparatus according to claim 1 in which the actuator is arranged to rotate the radar housing around a fixed lateral Y axis of the vehicle to induce pitch when moving from the first positon to the second position.

17. A radar apparatus for use in a vehicle, the apparatus comprising:
   a radar housing;
   a radar sensor provided within the radar housing;
   a movable support that comprises:
      a first part fixed relative to a body of the vehicle,
      a second part fixed relative to the radar housing, and
      an actuator for moving the second part between first and second positions relative to the first part while the vehicle is stationary around an axis that is fixed relative to the vehicle body,
   a first 3 axis accelerometer fixed in position relative to the radar sensor and having a first signal output;
   a second 3 axis accelerometer fixed in position relative to the vehicle and having a second signal output; and a signal processing apparatus that receives the first and second signal outputs and compares the first and second signal outputs when the second part is in the first position to determine a misalignment of the radar sensor in pitch and roll and compares the first and second signal outputs when the second part is in the second position for determining a misalignment of the radar sensor in yaw.

18. A method of detecting misalignment, or checking for the correct alignment, of a radar apparatus for a stationary vehicle, the method comprising:

comparing first and second signal outputs from, respectively, a first 3 axis accelerometer fixed in position relative to a radar sensor of the radar apparatus and a second 3 axis accelerometer fixed in position relative to the vehicle when the radar sensor has a first position to determine any misalignment of the radar sensor for pitch or roll, rotating the radar sensor about one of the X-axis and the Y-axis from the first position to a second position while the vehicle is stationary to intentionally cross-couple gravitational acceleration into one of the X-axis and the Y-axis;

generating third and fourth signal outputs from the respective first and second accelerometers when the radar sensor is in the second position; and comparing the third and fourth signal outputs to determine any misalignment of the radar sensor for yaw.

* * * * *

UNITED STATES PATENT AND TRADEMARK OFFICE
CERTIFICATE OF CORRECTION

| | |
|---|---|
| PATENT NO. | : 11,940,555 B2 |
| APPLICATION NO. | : 17/046862 |
| DATED | : March 26, 2024 |
| INVENTOR(S) | : Pinnock |

It is certified that error appears in the above-identified patent and that said Letters Patent is hereby corrected as shown below:

In the Claims

In Column 9, Line 34, Claim 3, delete "positon" and insert --position--, therefor.

In Column 9, Line 39, Claim 4, delete "positon" and insert --position--, therefor.

In Column 9, Line 54, Claim 6, delete "positon" and insert --position--, therefor.

In Column 10, Line 28, Claim 11, delete "positon" and insert --position--, therefor.

In Column 10, Line 52, Claim 16, delete "positon" and insert --position--, therefor.

Signed and Sealed this
Twenty-first Day of May, 2024

Katherine Kelly Vidal
*Director of the United States Patent and Trademark Office*